(12) United States Patent
Zhang (10) Patent No.: US 12,271,086 B2
(45) Date of Patent: Apr. 8, 2025

(54) LCD PANEL AND LCD DEVICE

(71) Applicant: TCL China Star Optoelectronics Technology Co., Ltd., Shenzhen (CN)

(72) Inventor: Ting Zhang, Shenzhen (CN)

(73) Assignee: TCL China Star Optoelectronics Technology Co., Ltd., Shenzhen (CN)

(*) Notice: Subject to any disclaimer, the term of this patent is extended or adjusted under 35 U.S.C. 154(b) by 0 days.

(21) Appl. No.: 16/640,743

(22) PCT Filed: Jan. 9, 2020

(86) PCT No.: PCT/CN2020/071235
§ 371 (c)(1),
(2) Date: Mar. 29, 2023

(87) PCT Pub. No.: WO2021/128492
PCT Pub. Date: Jul. 1, 2021

(65) Prior Publication Data
US 2023/0213825 A1    Jul. 6, 2023

(30) Foreign Application Priority Data
Dec. 24, 2019 (CN) .......................... 201911348266.4

(51) Int. Cl.
*G02F 1/1362* (2006.01)

(52) U.S. Cl.
CPC .............................. *G02F 1/136286* (2013.01)

(58) Field of Classification Search
CPC .................................................. G02F 1/136286
See application file for complete search history.

(56) References Cited

U.S. PATENT DOCUMENTS

| 2017/0221937 | A1 | 8/2017 | Shim et al. | |
| 2018/0358469 | A1* | 12/2018 | Uchida | H01L 27/1225 |
| 2019/0019819 | A1 | 1/2019 | Shim et al. | |
| 2019/0123149 | A1* | 4/2019 | Lee | H10K 59/1213 |
| 2019/0123206 | A1* | 4/2019 | Liu | H01L 27/1288 |

* cited by examiner

*Primary Examiner* — Edmond C Lau
(74) *Attorney, Agent, or Firm* — PV IP PC; Wei Te Chung (57) ABSTRACT

The present application provides a liquid crystal display (LCD) panel and an LCD device. In the LCD panel, a first metal layer and a second metal layer are connected to a metal connection layer through a first via hole and a second via hole, respectively. A difference between a depth of the first via hole and a depth of the second via hole is smaller than a sum of thicknesses of a gate insulating layer, an active layer, and the second metal layer. Accordingly, the depth of the first via hole is reduced, a length of the meal connection layer in the first via hole is shortened, and an impedance is lowered.

11 Claims, 5 Drawing Sheets

LCD PANEL AND LCD DEVICE

1. FIELD OF DISCLOSURE

The present embodiment relates to a field of display technology and in particular, to a liquid crystal display (LCD) panel and an LCD device.

2. DESCRIPTION OF RELATED ART

Figure 1:
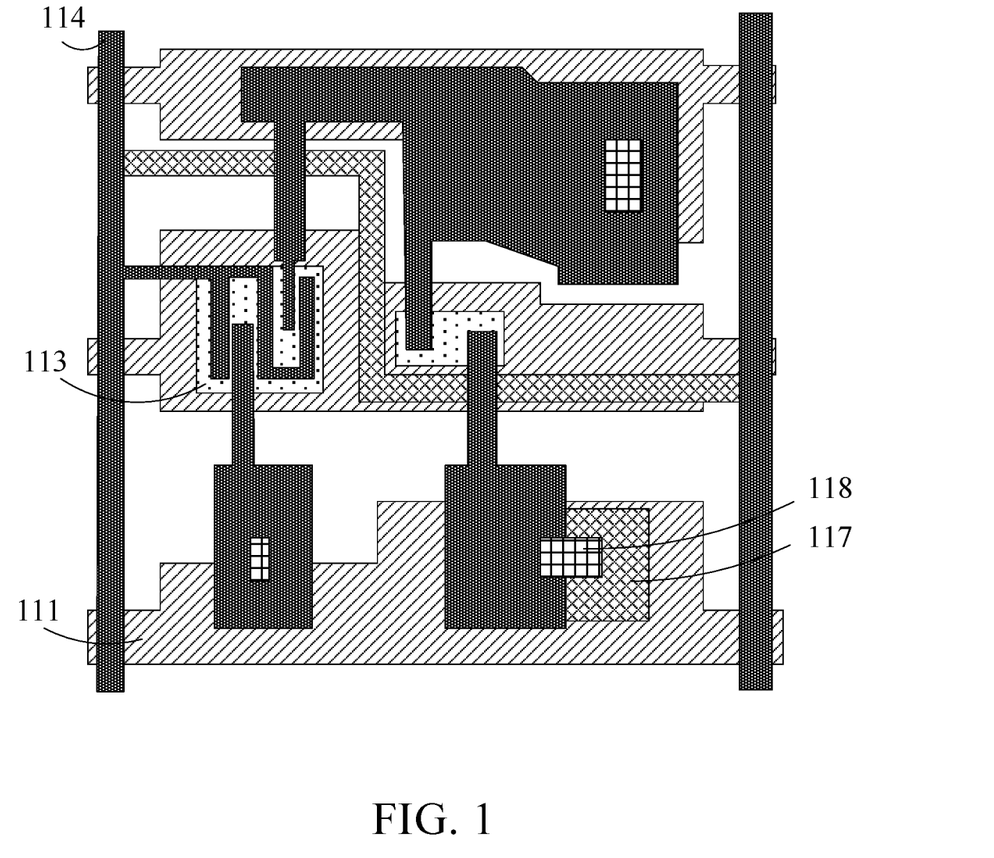
FIG. 1 is a first schematic view illustrating a conventional liquid crystal display (LCD) panel.
Figure 2:
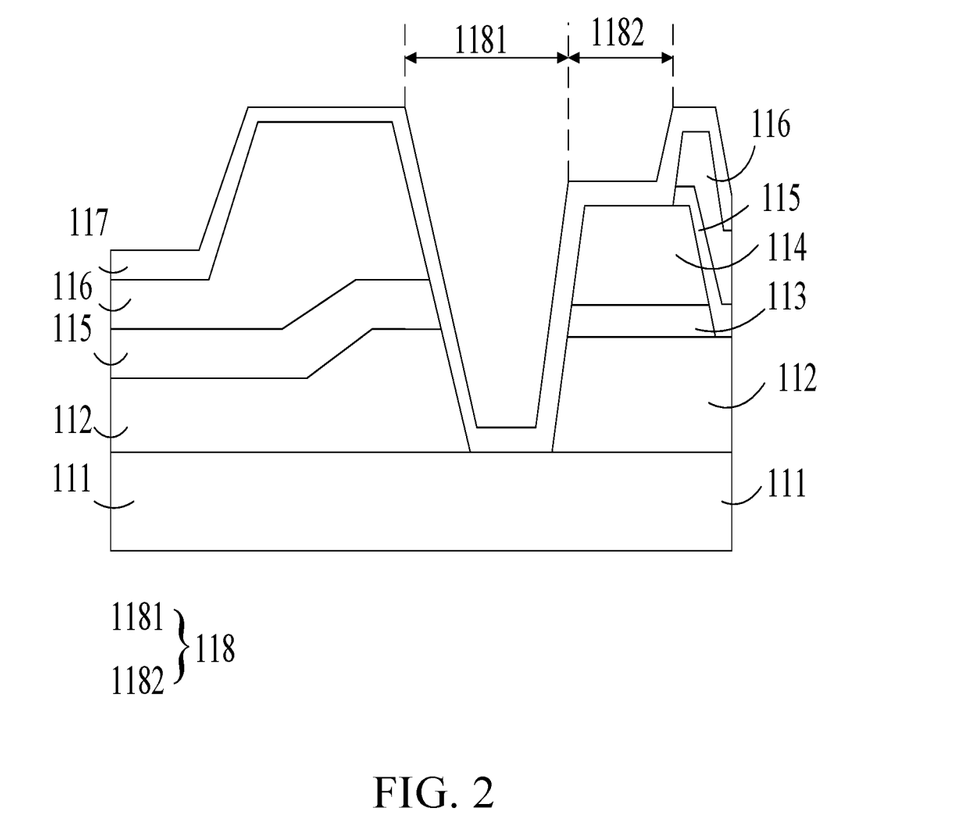
FIG. 2 is a second schematic view illustrating the conventional LCD panel.

Conventional liquid crystal display (LCD) panels designed with 3T (i.e., a main transistor, a sub-transistor, and a shared transistor) are shown in FIG. 1. The sub-pixels are charged by means of deep and shallow holes, and the shared transistor is used to discharge to a common potential, so that there is a potential difference between the main pixel and the sub-pixel, and a color shift is improved. However, in the configuration of the deep and shallow holes, the deep hole has a deep depth due to an overlapping arrangement of the deep and shallow holes as shown in FIGS. 1 and 2. When an indium tin oxide (ITO) layer is formed, a length of the ITO layer is longer, so an impedance of the ITO layer increases, and during formation of an insulating layer, a photoresist or other substance may fall into the deep hole, thus causing the ITO layer to be unable to be connected to a metal layer, thereby causing abnormal signal transmission during a signal transmission process.

Therefore, the conventional LCD panel has the technical problem that the impedance of the ITO layer increases and causes abnormal signal transmission due to the overlapping arrangement of the deep and shallow holes.

SUMMARY OF INVENTION

Technical Problem

The present application provides a liquid crystal display (LCD) panel and an LCD device, which are used to solve the technical problems of a conventional LCD panel in which an impedance of an indium tin oxide (ITO) layer increases and causes abnormal signal transmission due to an overlapping arrangement of deep and shallow holes.

Solution to Problem

Technical Solution

To solve the above problem, the technical solution provided by the application is as follows.

Accordingly, the present application provides a liquid crystal display (LCD) panel, comprising:
  a substrate;
  a first metal layer disposed on the substrate;
  a gate insulating layer disposed on the first metal layer;
  an active layer disposed on the gate insulating layer;
  a second metal layer disposed on the active layer;
  a passivation layer disposed on the second metal layer; and
  a metal connection layer disposed on the passivation layer;
  wherein the metal connection layer is connected to the first metal layer through a first via hole, the met0al connection layer is connected to the second metal layer through a second via hole, and a difference between a depth of the first via hole and a depth of the second via hole is smaller than a sum of thicknesses of the gate insulating layer, the active layer, and the second metal layer.

In some embodiments, a projection of the first metal layer on a lateral side of the LCD panel overlaps a projection of the second metal layer on the lateral side of the LCD panel.

In some embodiments, a planarization layer is disposed between the passivation layer and the metal connection layer, and a thickness of the first via hole passing through the planarization layer is equal to a thickness of the second via hole passing through the planarization layer.

In some embodiments, a thickness of the first via hole passing through the passivation layer is less than a thickness of the second via passing through the passivation layer.

In some embodiments, a thickness of the first via hole passing through the gate insulating layer is smaller than a thickness of the gate insulating layer under the second via hole.

In some embodiments, a depth of the first via hole is equal to a depth of the second via hole.

In some embodiments, a planarization layer is disposed between the passivation layer and the metal connection layer, and a thickness of the first via hole passing through the planarization layer is less than a thickness of the second via hole passing through the planarization layer.

In some embodiments, a planarization layer is disposed between the passivation layer and the metal connection layer, a thickness of the first via hole passing through the planarization layer is greater than a thickness of the second via hole passing through the planarization layer, and a difference between a depth of the first via hole and a depth of the second via hole is smaller than a sum of thicknesses of the gate insulating layer, the active layer, the second metal layer, and the planarization layer.

In some embodiments, a cross-sectional area of the first via hole is smaller than a cross-sectional area of the second via hole.

In some embodiments, a buffer layer is disposed between the substrate and the first metal layer, and a thickness of the buffer layer under the first via hole is greater than a thickness of the buffer layer under the second via hole.

The present application provides a liquid crystal display (LCD) device comprising an LCD panel and a backlight module, the LCD panel comprising:
  a substrate;
  a first metal layer disposed on the substrate;
  a gate insulating layer disposed on the first metal layer;
  an active layer disposed on the gate insulating layer;
  a second metal layer disposed on the active layer;
  a passivation layer disposed on the second metal layer; and
  a metal connection layer disposed on the passivation layer;
  wherein the metal connection layer is connected to the first metal layer through a first via hole, the metal connection layer is connected to the second metal layer through a second via hole, and a difference between a depth of the first via hole and a depth of the second via hole is smaller than a sum of thicknesses of the gate insulating layer, the active layer, and the second metal layer.

In some embodiments, a projection of the first metal layer on a lateral side of the LCD panel overlaps a projection of the second metal layer on the lateral side of the LCD panel.

In some embodiments, a planarization layer is disposed between the passivation layer and the metal connection layer, and a thickness of the first via hole passing through the planarization layer is equal to a thickness of the second via hole passing through the planarization layer.

In some embodiments, a thickness of the first via hole passing through the passivation layer is less than a thickness of the second via passing through the passivation layer.

In some embodiments, a thickness of the first via hole passing through the gate insulating layer is less than a thickness of the gate insulating layer under the second via hole.

In some embodiments, a depth of the first via hole is equal to a depth of the second via hole.

In some embodiments, a planarization layer is disposed between the passivation layer and the metal connection layer, and a thickness of the first via hole passing through the planarization layer is less than a thickness of the second via hole passing through the planarization layer.

In some embodiments, a planarization layer is disposed between the passivation layer and the metal connection layer, a thickness of the first via hole passing through the planarization layer is greater than a thickness of the second via hole passing through the planarization layer, and a difference between a depth of the first via hole and a depth of the second via hole is smaller than a sum of thicknesses of the gate insulating layer, the active layer, the second metal layer, and the planarization layer.

In some embodiments, a cross-sectional area of the first via hole is smaller than a cross-sectional area of the second via hole.

In some embodiments, a buffer layer is disposed between the substrate and the first metal layer, and a thickness of the buffer layer under the first via hole is greater than a thickness of the buffer layer under the second via hole.

Advantages

Benefits

The application provides a liquid crystal display (LCD) panel and an LCD device. The LCD panel comprises a substrate, a first metal layer, a gate insulating layer, an active layer, a second metal layer, a passivation layer, and a metal connection layer. The first metal layer is disposed on the substrate, the gate insulating layer is disposed on the first metal layer, the active layer is disposed on the gate insulating layer, the second metal layer is disposed on the active layer, the passivation layer is disposed on the second metal layer, and the metal connection layer is disposed on the passivation layer. The metal connection layer is connected to the first metal layer through a first via hole, the metal connection layer is connected to the second metal layer through a second via hole. A difference between a depth of the first via hole and a depth of the second via hole is smaller than a sum of thicknesses of the gate insulating layer, the active layer, and the second metal layer. The first metal layer and the second metal layer are connected to the metal connection layer through the first via hole and the second via hole, respectively, so that the first via hole is separated from the second via hole, and the difference between the depth of the first via hole and the depth of the second via hole is smaller than the sum of the thicknesses of the gate insulating layer, the active layer, and the second metal layer, and as a result, the depth of the first via hole is reduced, the metal connection layer has a shorter length in the first via hole, and as impedance is reduced. The depth of the first via hole is reduced, the risk of breakage of a metal line is reduced, and the possibility of poor connection is reduced, so the impedance of the metal connection layer is lowered. Accordingly, the present application solves the problem of a conventional LCD panel that an impedance of an ITO layer increases and causes abnormal signal transmission due to an overlapping arrangement of deep and shallow holes.

DESCRIPTION OF INVENTION EMBODIMENTS

The present application provides a liquid crystal display (LCD) panel and an LCD device. In order to make the purpose, technical solution, and effect of the present application clearer and more specific, the present application is further described in detail below with reference to the accompanying drawings and embodiments. It should be understood that the specific embodiments described herein are only used to explain the application, and are not used to limit the present application.

The present application solves the problem of a conventional LCD panel that an impedance of the indium tin oxide (ITO) layer increases and causes abnormal signal transmission due to an overlapping arrangement of deep and shallow holes. The present application solves this problem.

As shown in FIGS. 1 and 2, a conventional LCD panel with a 3T design includes a first metal layer 111, a gate insulating layer 112, an active layer 113, a second metal layer 114, a passivation layer 115, and a planarization layer 116, and an indium tin oxide (ITO) layer 117. In conventional techniques, in order to realize a potential difference between a main pixel and a sub-pixel, ITO is used to connect a drain electrode of a shared transistor to a common potential, thereby lowering a potential of the sub-pixel and causing the potential difference between the main pixel and the sub-pixel. As shown in FIG. 2, ITO connects the first metal layer 111 to the second metal layer 114 through via holes 118 (including a deep hole 1181 and a shallow hole 1182), wherein ITO is connected to the first metal layer 111 through the deep hole 1181, and ITO is connected to the second metal layer 114 through the shallow hole 1182, so that the sub-pixel is discharged to the common potential, the potential difference between the main pixel and the sub-pixel is achieved, and a color shift problem is improved. However, it can be known from FIG. 2 that, the deep hole needs to pass through multiple film layers, so that a depth of the deep hole is deep, and accordingly, when the ITO layer is formed in the deep hole, the film layers such as the passivation layer and the planarization layer may go into the deep hole. As a result, the ITO layer cannot be connected to the first metal layer, and ITO has a higher impedance due to a longer length of the ITO layer, thus causing a large signal loss or even transmission failures during a signal transmission process. That is to say, the conventional LCD panel has a technical problem that the impedance of the ITO layer increases and causes abnormal signal transmission due to the overlapping arrangement of the deep and shallow holes.

Figure 3:
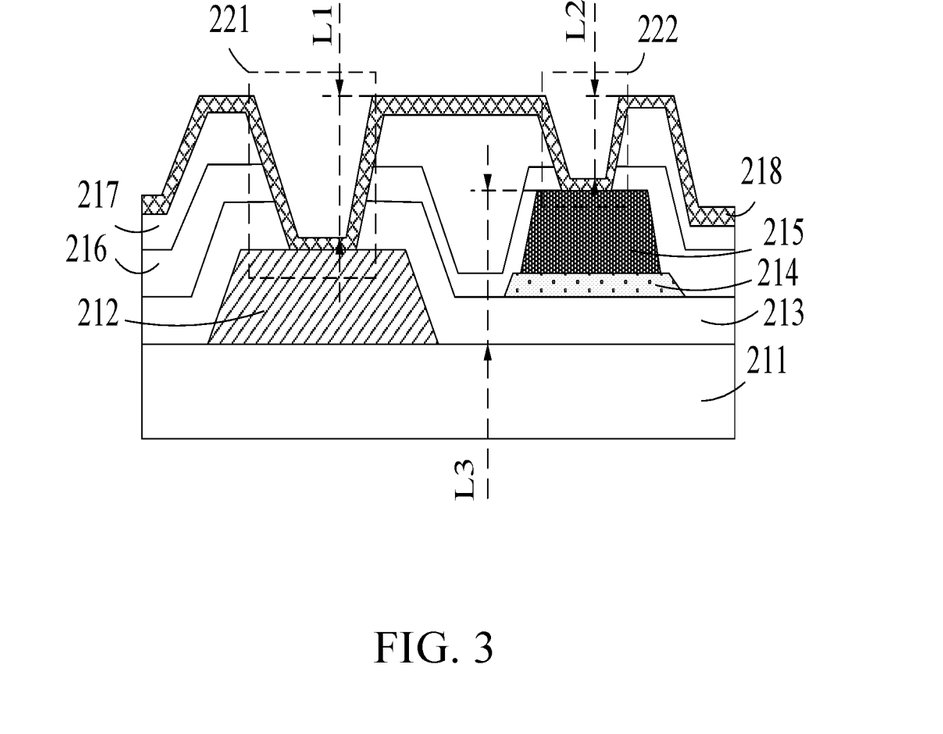
FIG. 3 is a first schematic view illustrating an LCD panel according to one embodiment of the present application.

Referring to FIG. 3, a liquid crystal display (LCD) panel is provided according to one embodiment of the present application. The LCD panel comprises:

a substrate 211;

a first metal layer 212 disposed on the substrate 211;

a gate insulating layer 213 disposed on the first metal layer 212;

an active layer 214 disposed on the gate insulating layer 213;

a second metal layer 215 disposed on the active layer 214;

a passivation layer 216 disposed on the second metal layer 215; and a metal connection layer 218 disposed on the passivation layer 216;

wherein the metal connection layer 218 is connected to the first metal layer 212 through a first via hole 221, the metal connection layer 218 is connected to the second metal layer 215 through a second via hole 222, and a difference between a depth L1 of the first via hole 221 and a depth L2 of the second via hole 222 is smaller than a sum L3 of thicknesses of the gate insulating layer 213, the active layer 214, and the second metal layer 215.

The present application provides an LCD panel. The LCD panel comprises a substrate, a first metal layer, a gate insulating layer, an active layer, a second metal layer, a passivation layer, and a metal connection layer. The first metal layer is disposed on the substrate. The gate insulating layer is disposed on the first metal layer. The active layer is disposed on the gate insulating layer. The second metal layer is disposed on the active layer. The passivation layer is disposed on the second metal layer. The metal connection layer is disposed on the passivation layer. The metal connection layer is connected to the first metal layer through a first via hole, the metal connection layer is connected to the second metal layer through a second via hole, and a difference between a depth of the first via hole and a depth of the second via hole is smaller than a sum of thicknesses of the gate insulating layer, the active layer, and the second metal layer. By connecting the first metal layer and the second metal layer to the metal connection layer through the first via hole and the second via hole respectively, the first via hole is separated from the second via hole. In addition to that, the difference between the depth of the first via hole and the depth of the second via hole is smaller than the sum of the thicknesses of the gate insulating layer, the active layer, and the second metal layer. Therefore, the depth of the first via hole is reduced, so that when the metal connection layer passes through the first via hole, a length of the metal connection layer in the first via hole is shortened, thereby reducing the impedance. Moreover, because the depth of the first via hole is reduced, a risk of breakage of the metal line is reduced, and a risk of poor connection is reduced, thereby reducing the impedance of the metal connection layer and solving the problem of the conventional LCD panel that abnormal signal transmission occurs due to the high impedance of the ITO layer resulting from the overlapping arrangement of the deep and shallow holes.

It should be noted that, when the present application states that a film layer has different thicknesses in different regions, a thickness is the thickness of the film layer in a particular position.

It should be noted that, for a via hole with a cross-section of an inverted trapezoid, a cross-sectional area of the via hole refers to a cross-sectional area of a bottom of the via hole, i.e., the minimum cross-sectional area of the via hole.

Figure 4:
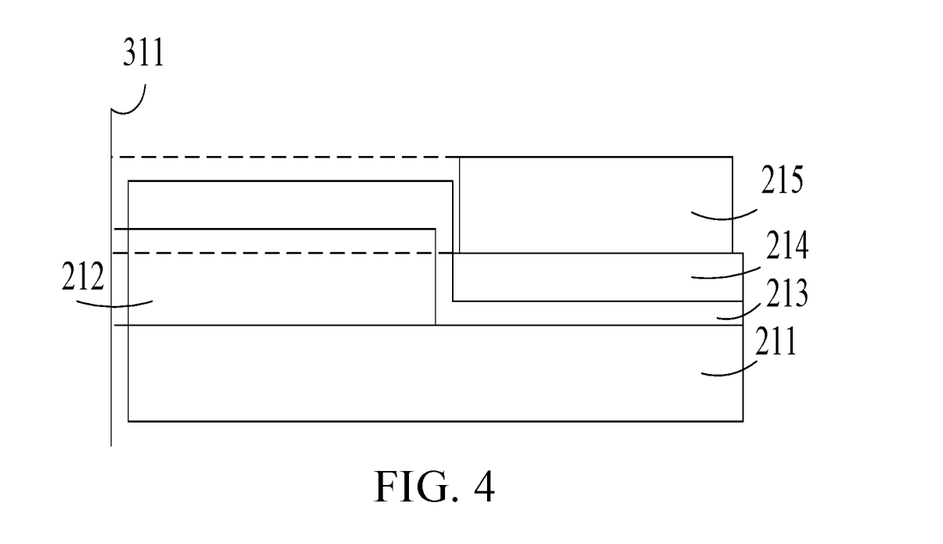
FIG. 4 is a second schematic view illustrating the LCD panel according to one embodiment of the present application.

Referring to FIG. 4, in one embodiment of the present invention, a projection of the first metal layer 211 on a lateral side 311 of the LCD panel overlaps a projection of the second metal layer 215 on the lateral side 311 of the LCD panel. When the first metal layer and the second metal layer are formed, the first metal layer under the second via hole is removed, so that the first metal layer is not disposed under the second via hole, resulting in that the second via hole is higher above the substrate, and the depth of the first via hole is increased. To solve this problem, the projection of the first metal layer on the lateral side of the LCD panel overlaps the projection of the second metal layer on the lateral side of the LCD panel. Therefore, the difference between the depth of the first via hole and the depth of the second via hole is reduced, and as a result, the depth of the first via hole is decreased, and a film layer such as the passivation layer is difficult to deposit in the first via hole when the metal connection layer is disposed in the first via hole. In the first via hole, and the length of the metal connection layer in the first via hole is shortened. Thus, the metal connection layer normally transmits signals, and the impedance of the metal connection layer is reduced.

In one embodiment, as shown in FIG. 3, the planarization layer 217 is disposed between the passivation layer 216 and the metal connection layer 218, and a thickness of the first via hole 221 passing through the planarization layer 217 is equal to a thickness of the second via hole 222 passing through the planarization layer 217. That is, for the LCD panel provided with the planarization layer, when the thickness of the planarization layer is not changed, the difference between the depths of the first via hole and the second via hole is smaller than the sum of the thicknesses of the gate insulating layer, the active layer, and the second metal layer, and therefore, the depth of the first via hole is decreased. Thus, for the LCD panel provided with the planarization layer, a voltage drop of the metal connection layer can also be reduced, and the poor connection problem between the metal connection layer and the first metal layer is prevented.

In one embodiment, the planarization layer is made of one of copper and soluble polytetrafluoroethylene.

In one embodiment of the present invention, the thickness of the first via hole passing through the passivation layer is less than the thickness of the second via hole passing through the passivation layer. Because the first via hole and the second via hole are both required to pass through the passivation layer, a thickness of the first metal layer can be increased by reducing the thickness of the passivation layer through which the first via hole passes, so that the depth of the first via hole is decreased, accordingly the length of the metal connection layer in the first via hole is decreased, and a length of the metal connection layer in other regions remains unchanged, thereby reducing the impedance of the metal connection layer, and further reducing the possibility of the insulating layer and the planarization layer filling in the first via hole.

In one embodiment of the present invention, the thickness of the first via hole passing through the gate insulating layer is less than the thickness of the gate insulating layer under the second via hole. In forming the gate insulating layer, a thickness of the gate insulating layer under the first via hole is reduced, and thereby the thickness of the first metal layer is increased correspondingly, so that the depth of the first via hole is reduced while a thickness of the gate insulating layer under the second via hole is unchanged. Therefore, the depth of the first via hole and the depth of the second via hole are similar, the length of the metal connection layer is decreased, and a voltage drop of the metal connection layer is reduced.

In one embodiment of the present invention, the depth of the first via hole is equal to the depth of the second via hole. Before the first via hole and the second via hole are performed, each film layer is processed to make a projection of an upper end of the first metal layer coincide with a projection of an upper end of the second metal layer on a lateral side of the LCD panel, so that the depth of the first via hole is equal to the depth of the second via hole, which greatly reduces the depth of the first via hole and shortens the length of the metal connection layer. Moreover, the first via hole is shallow, so the risk of breakage of the metal connection layer in the first via hole is reduced, the possibility that the passivation layer and the planarization layer fill in the first via hole is reduced, and the metal connection layer and the first metal layer are better connected to each other, so that signals of the second metal layer are better transmitted to the first metal layer, a voltage of the sub-pixel is reduced to cause a potential difference between the main pixel and the sub-pixel, and a color shift problem is improved.

In one embodiment, the planarization layer is disposed between the passivation layer and the metal connection layer, and the thickness of the first via hole passing through the planarization layer is less than the thickness of the second via hole passing through the planarization layer. In other words, in forming the planarization layer, the thickness of the planarization layer in the first via hole is reduced, so the depth of the first via hole is reduced, and the length of the metal connection layer is shortened.

In one embodiment, the planarization layer is disposed between the passivation layer and the metal connection layer, the thickness of the first via hole passing through the planarization layer is greater than the thickness of the second via hole passing through the planarization layer, and the difference between the depth of the first via hole and the depth of the second via hole is smaller than the sum of the thicknesses of the gate insulating layer, the active layer, the second metal layer, and the planarization layer. In forming the planarization layer, the thickness of the planarization layer in the first via hole is greater than the thickness of the planarization layer in the second via hole while the difference between the depth of the first via hole and the depth of the second via hole is less than the sum of the thicknesses of the gate insulating layer, the active layer, the second metal layer, and the planarization layer. It should be noted that, the thickness of the planarization layer here refers to the thickness of the planarization layer in a particular position. The depth of the first via hole is reduced, and the depth of the second via hole is also reduced, thereby greatly reducing the length of the metal connection layer.

In one embodiment, the cross-sectional area of the first via hole is smaller than the cross-sectional area of the second via hole. For the via hole with an inverted trapezoidal shape, as shown in FIG. 3, the cross-sectional area of the first via hole refers to the cross-sectional area that is in contact with the first metal layer, and the cross-sectional area is the minimum cross-sectional area of the first via hole, and the cross-sectional area of the second via hole is the cross-sectional area that is the minimum cross-sectional area of the second via hole, so the cross-sectional area of the first via hole is smaller than the cross-sectional area of the second via hole, so that the metal connection layer in the first via hole has a short length, and the voltage drop of the metal connection layer is reduced.

In one embodiment of the present invention, the metal connection layer is made of indium tin oxide (ITO).

Figure 7:
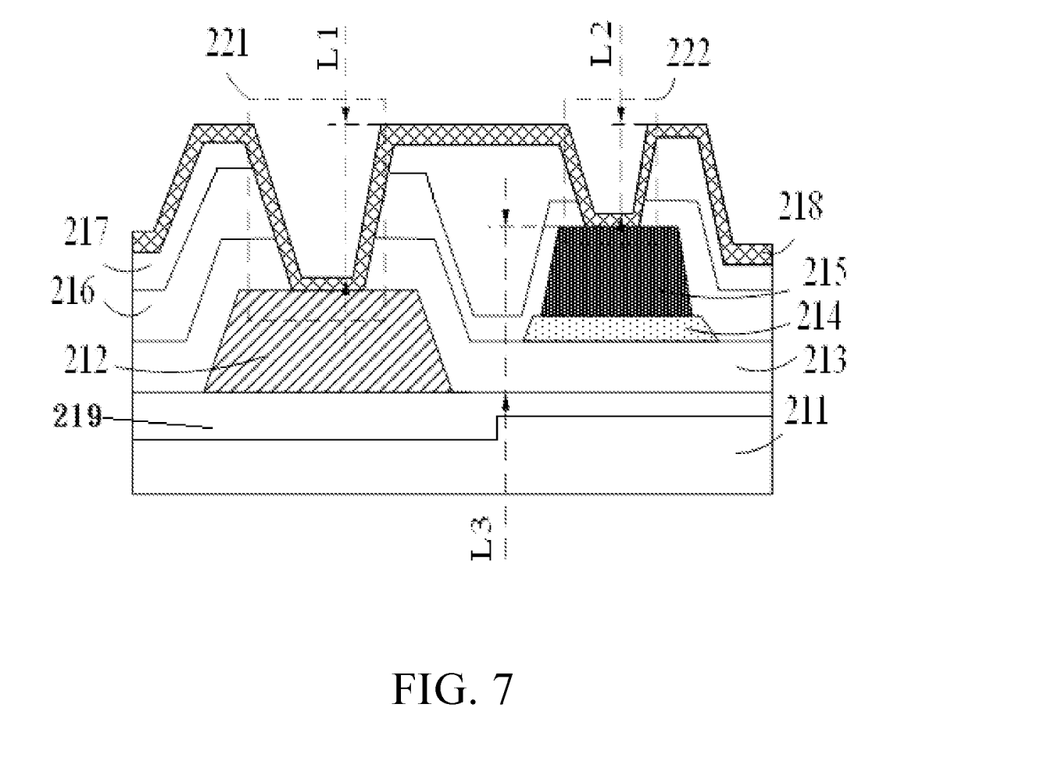
FIG. 7 is a fourth schematic view illustrating an LCD panel according to one embodiment of the present application.

In one embodiment, as shown in FIG. 7, a buffer layer 219 is provided between the substrate 211 and the first metal layer 212, and a thickness of the buffer layer 219 under the first via hole 221 is greater than a thickness of the buffer layer 219 under the second via hole 222. By increasing the thickness of the buffer layer 219 under the first metal layer 212, a height of the first metal layer 212 is increased, and the depth of the corresponding first via hole 221 may be reduced, so that the length of the metal connection layer 218 may be shortened.

In one embodiment, an auxiliary layer is disposed between the substrate and the first metal layer, the auxiliary layer is used to increase the height of the first metal layer, and a thickness of the auxiliary layer under the first via hole is greater than a thickness of the auxiliary layer under the second via hole. In other words, by adding the auxiliary layer, the first via hole and the second via hole are at higher levels, thereby reducing the depths of the first via hole and the second via hole, shortening the length of the metal connection layer, and reducing the impedance.

TABLE 1

| | Diameter of the second via hole | Distance from the second via hole to an edge of the second metal layer | Distance between the first metal layer and the second metal layer | Diameter of the first via hole |
|---|---|---|---|---|
| Conventional techniques | — | — | — | 7 (6) |
| First embodiment | 7 | 6 × 2 | 2 | 9 |
| Second embodiment | 9 | 5 × 2 | 2 | 9 |
| Third embodiment | 11 | 4 × 2 | 2 | 9 |
| Fourth embodiment | 7 | 4 × 2 | 3 | 8 |

Figure 5:
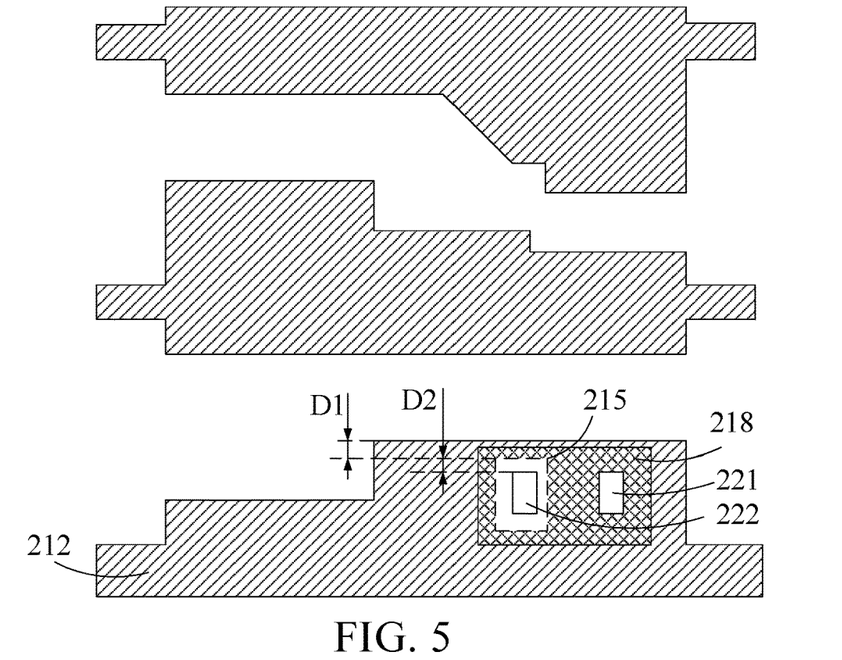
FIG. 5 is a third schematic view illustrating the LCD panel according to one embodiment of the present application.

As shown in Table 1 and FIG. 5, in conventional techniques, when it is required to make a deep hole have a minimum cross-sectional diameter of 7 micrometers, the diameter of 7 micrometers cannot be formed due to the influence of the passivation layer and the planarization layer, and the diameter is 6 micrometers instead. The deep hole is filled with an insulating substance, resulting in a poor connection between ITO and the first metal layer, and abnormal signal transmission. In the present application, the first and second via holes are set to have different diameters. As shown in Table 1, the first and second via holes have different diameters in the first to fourth embodiments, and Table 1 shows the actual sizes of the first and second via holes, the distance from the second via hole to the edge of the second metal layer, and the distance between the first metal layer and the second metal layer. For example, in the first embodiment, the diameter of the first via hole is 9 micrometers, and the diameter of the second via hole is 7 micrometers. As can be seen from Table 1, the diameter of the first via hole can be 9 micrometers, and the diameter of the second via hole can also be 7 micrometers; the distance from the second via hole to the edge of the second metal layer is 6×2, wherein "6" is the size of D2 in FIG. 5 and "×2" represents that the distances from two sides of the second via hole to the two edges of the second metal layer are both "6"; and the distance between the first metal layer and the second metal layer is D1 in FIG. 5, and D1 is 2 micrometers. By correspondingly altering the sizes of the first via hole and the second via hole, the distance from the second via hole to the edge of the second metal layer and the distance between the first metal layer and the second metal layer are obtained. In other words, the design for the first via hole and the second via hole of the present application can make the sizes of the first via hole and the second via hole reach the predetermined sizes, thereby preventing the insulating layer from filling the first via hole and the second via hole, avoiding poor connection between ITO and the first metal layer, and avoiding abnormal signal transmission.

Figure 6:
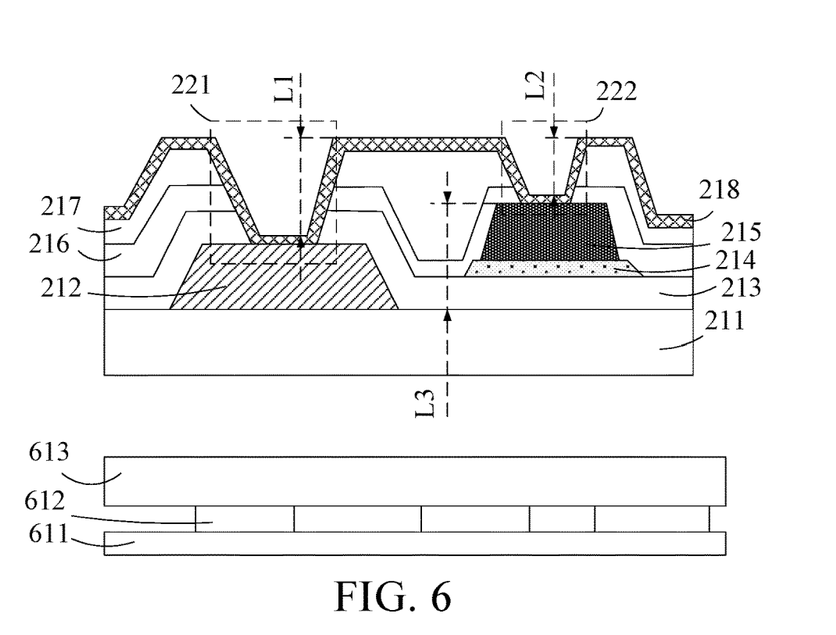
FIG. 6 is a schematic view illustrating an LCD device according to one embodiment of the present application.

Referring to FIG. 6, the present application provides a liquid crystal display (LCD) device comprising an LCD panel and a backlight module, the LCD panel comprising:

a substrate 211;

a first metal layer 212 disposed on the substrate 211;

a gate insulating layer 213 disposed on the first metal layer 212;

an active layer 214 disposed on the gate insulating layer 213;

a second metal layer 215 disposed on the active layer 214;

a passivation layer 216 disposed on the second metal layer 215; and a metal connection layer 218 disposed on the passivation layer 216;

wherein the metal connection layer 218 is connected to the first metal layer 212 through a first via hole 221, the metal connection layer 218 is connected to the second metal layer 215 through a second via hole 222, and a difference between a depth L1 of the first via hole 221 and a depth L2 of the second via hole 222 is smaller than a sum L3 of thicknesses of the gate insulating layer 213, the active layer 214, and the second metal layer 215.

The present application provides an LCD device. The LCD device comprises an LCD panel and a backlight module. The LCD panel comprises a substrate 211, a first metal layer 212, a gate insulating layer 213, an active layer 214, a second metal layer 215, a passivation layer 216, and a metal connection layer 218. The first metal layer 212 is disposed on the substrate 211. The gate insulating layer 213 is disposed on the first metal layer 212. The active layer 214 is disposed on the gate insulating layer 213. The second metal layer 215 is disposed on the active layer 214. The passivation layer 216 is disposed on the second metal layer 215. The metal connection layer 218 is disposed on the passivation layer 216. The metal connection layer 218 is connected to the first metal layer 212 through a first via hole 221, the metal connection layer 218 is connected to the second metal layer 215 through a second via hole 222, and a difference between a depth L1 of the first via hole 212 and a depth L2 of the second via hole 222 is smaller than a sum L3 of thicknesses of the gate insulating layer 213, the active layer 214, and the second metal layer 215. By connecting the first metal layer 212 and the second metal layer 215 to the metal connection layer 218 through the first via hole 221 and the second via hole 222, the first via hole 221 is separated from the second via hole 222. Moreover, the difference between the depth of the first via hole and the depth of the second via hole is smaller than the sum of the thicknesses of the gate insulating layer, the active layer, and the second metal layer. Therefore, the depth of the first via hole is reduced, so that a length of the metal connection layer in the first via hole is shortened, thereby reducing the impedance. Moreover, because the depth of the first via hole is reduced, a risk of breakage of the metal line is reduced, and a risk of poor connection is reduced, thereby reducing the impedance of the metal connection layer and solving the problem of the conventional LCD panel that abnormal signal transmission occurs due to the high impedance of the ITO layer resulting from the overlapping arrangement of the deep and shallow holes.

In one embodiment, as shown in FIG. 6, the backlight module comprises a back plate 611, a light source 612, and an optical film 613.

In one embodiment of the LCD device, a projection of the first metal layer on a lateral side of the LCD panel overlaps a projection of the second metal layer on the lateral side of the LCD panel.

In one embodiment of the LCD device, a planarization layer is disposed between the passivation layer and the metal connection layer, and a thickness of the first via hole passing through the planarization layer is equal to a thickness of the second via hole passing through the planarization layer.

In one embodiment of the LCD device, a thickness of the first via hole passing through the passivation layer is less than a thickness of the second via passing through the passivation layer.

In one embodiment of the LCD device, a thickness of the first via hole passing through the gate insulating layer is smaller than a thickness of the gate insulating layer under the second via hole.

In one embodiment of the LCD device, a depth of the first via hole is equal to a depth of the second via hole.

In one embodiment of the LCD device, a planarization layer is disposed between the passivation layer and the metal connection layer, and a thickness of the first via hole passing through the planarization layer is less than a thickness of the second via hole passing through the planarization layer.

In one embodiment of the LCD device, a planarization layer is disposed between the passivation layer and the metal connection layer, a thickness of the first via hole passing through the planarization layer is greater than a thickness of the second via hole passing through the planarization layer, and a difference between a depth of the first via hole and a depth of the second via hole is smaller than a sum of thicknesses of the gate insulating layer, the active layer, the second metal layer, and the planarization layer.

In one embodiment of the LCD device, a cross-sectional area of the first via hole is smaller than a cross-sectional area of the second via hole.

In one embodiment of the LCD device, a buffer layer is disposed between the substrate and the first metal layer, and a thickness of the buffer layer under the first via hole is greater than a thickness of the buffer layer under the second via hole.

It can be known from the above embodiments:

The present application provides an LCD panel and an LCD device. The LCD panel comprises a substrate, a first metal layer, a gate insulating layer, an active layer, a second metal layer, a passivation layer, and a metal connection layer. The first metal layer is disposed on the substrate. The gate insulating layer is disposed on the first metal layer. The active layer is disposed on the gate insulating layer. The second metal layer is disposed on the active layer. The passivation layer is disposed on the second metal layer. The metal connection layer is disposed on the passivation layer. The metal connection layer is connected to the first metal layer through a first via hole, the metal connection layer is connected to the second metal layer through a second via hole, and a difference between a depth of the first via hole and a depth of the second via hole is smaller than a sum of thicknesses of the gate insulating layer, the active layer, and the second metal layer. By connecting the first metal layer and the second metal layer to the metal connection layer through the first via hole and the second via hole, the first via hole is separated from the second via hole. Moreover, the difference between the depth of the first via hole and the depth of the second via hole is smaller than the sum of the thicknesses of the gate insulating layer, the active layer, and the second metal layer. Therefore, the depth of the first via hole is reduced, so that a length of the metal connection layer in the first via hole is shortened, thereby reducing the impedance. Moreover, because the depth of the first via hole is reduced, a risk of breakage of the metal line (the metal connection layer) is reduced, and a risk of poor connection is reduced, thereby reducing the impedance of the metal connection layer and solving the problem of the conventional LCD panel that abnormal signal transmission occurs due to the high impedance of the ITO layer resulting from the overlapping arrangement of the deep and shallow holes.

It will be appreciated that a person of ordinary skill in the art can make equivalent replacements or changes according to the technical solution of the present application and its inventive concept, and all these changes or replacements should fall within the protection scope of the appended claims of this application.

What is claimed is:

1. A liquid crystal display (LCD) panel, comprising:
a substrate;
a first metal layer disposed on the substrate;
a gate insulating layer disposed on the first metal layer;
an active layer disposed on the gate insulating layer;
a second metal layer disposed on the active layer;
a passivation layer disposed on the second metal layer; and
a metal connection layer disposed on the passivation layer, wherein a planarization layer is disposed between the passivation layer and the metal connection layer;
wherein the metal connection layer is connected to the first metal layer through a first via hole, the metal connection layer is connected to the second metal layer through a second via hole, and a difference between a depth of the first via hole and a depth of the second via hole is smaller than a sum of thicknesses of the gate insulating layer, the active layer, and the second metal layer;
wherein a thickness of the first via hole passing through the planarization layer is equal to a thickness of the second via hole passing through the planarization layer, and a difference between a depth of the first via hole and a depth of the second via hole is smaller than a sum of thicknesses of the gate insulating layer, the active layer, the second metal layer, and the planarization layer.

2. The LCD panel according to claim 1, wherein a projection of the first metal layer on a lateral side of the LCD panel overlaps a projection of the second metal layer on the lateral side of the LCD panel.

3. The LCD panel according to claim 1, wherein a thickness of the first via hole passing through the passivation layer is less than a thickness of the second via passing through the passivation layer.

4. The LCD panel according to claim 1, wherein a thickness of the first via hole passing through the gate insulating layer is smaller than a thickness of the gate insulating layer under the second via hole.

5. The LCD panel according to claim 1, wherein a cross-sectional area of the first via hole is smaller than a cross-sectional area of the second via hole.

6. A liquid crystal display (LCD) device comprising an LCD panel and a backlight module, the LCD panel comprising:
a substrate;
a first metal layer disposed on the substrate;
a gate insulating layer disposed on the first metal layer;
an active layer disposed on the gate insulating layer;
a second metal layer disposed on the active layer;
a passivation layer disposed on the second metal layer; and
a metal connection layer disposed on the passivation layer, wherein a planarization layer is disposed between the passivation layer and the metal connection layer;
wherein the metal connection layer is connected to the first metal layer through a first via hole, the metal connection layer is connected to the second metal layer through a second via hole, and a difference between a depth of the first via hole and a depth of the second via hole is smaller than a sum of thicknesses of the gate insulating layer, the active layer, and the second metal layer;
wherein a thickness of the first via hole passing through the planarization layer is equal to a thickness of the second via hole passing through the planarization layer, and a difference between a depth of the first via hole and a depth of the second via hole is smaller than a sum of thicknesses of the gate insulating layer, the active layer, the second metal layer, and the planarization layer.

7. The LCD device according to claim 6, wherein a projection of the first metal layer on a lateral side of the LCD panel overlaps a projection of the second metal layer on the lateral side of the LCD panel.

8. The LCD device according to claim 6, wherein a thickness of the first via hole passing through the gate insulating layer is less than a thickness of the gate insulating layer under the second via hole.

9. The LCD device according to claim 6, wherein a cross-sectional area of the first via hole is smaller than a cross-sectional area of the second via hole.

10. A liquid crystal display (LCD) device comprising an LCD panel and a backlight module, the LCD panel comprising:
- a substrate;
- a first metal layer disposed on the substrate;
- a gate insulating layer disposed on the first metal layer;
- an active layer disposed on the gate insulating layer;
- a second metal layer disposed on the active layer;
- a passivation layer disposed on the second metal layer; and
- a metal connection layer disposed on the passivation layer;
- wherein the metal connection layer is connected to the first metal layer through a first via hole, the metal connection layer is connected to the second metal layer through a second via hole, and a difference between a depth of the first via hole and a depth of the second via hole is smaller than a sum of thicknesses of the gate insulating layer, the active layer, and the second metal layer;
- wherein a thickness of the first via hole passing through the planarization layer is equal to a thickness of the second via hole passing through the planarization layer, and a difference between a depth of the first via hole and a depth of the second via hole is smaller than a sum of thicknesses of the gate insulating layer, the active layer, the second metal layer, and the planarization layer.

11. The LCD panel according to claim 10, wherein a projection of the first metal layer on a lateral side of the LCD panel overlaps a projection of the second metal layer on the lateral side of the LCD panel.

* * * * *